United States Patent [19]

Ohkanda

[11] Patent Number: 5,373,641
[45] Date of Patent: Dec. 20, 1994

[54] RECIPROCATING CUTTER TYPE TRIMMER

[75] Inventor: Masao Ohkanda, Sagamihara, Japan

[73] Assignee: Kioritz Corporation, Tokyo, Japan

[21] Appl. No.: 105,729

[22] Filed: Aug. 13, 1993

[30] Foreign Application Priority Data

Aug. 14, 1992 [JP] Japan .................. 4-057316[U]

[51] Int. Cl.⁵ ............................................. A01G 3/04
[52] U.S. Cl. ........................................ 30/216; 30/228; 30/330
[58] Field of Search .................. 30/369, 502, 392, 394, 30/501, 330, 331, 379, 379.5, 228, 216, 217, 218, 219, 220, 208; 83/954; 56/233, 236, 242

[56] References Cited

U.S. PATENT DOCUMENTS

| | | | |
|---|---|---|---|
| 710,904 | 10/1902 | Stites | 30/330 |
| 1,358,485 | 11/1920 | Weber | 30/330 X |
| 2,914,099 | 11/1959 | Kaufmann | 30/369 |
| 3,083,457 | 4/1963 | Ottosen et al. | |
| 3,572,409 | 3/1971 | Hoffman | 30/392 X |
| 3,597,908 | 8/1971 | Schaefer | 56/233 |
| 5,155,914 | 10/1992 | Ohkanda | 30/392 X |

FOREIGN PATENT DOCUMENTS 26422  1/1990  Japan .

Primary Examiner—Rinaldi I. Rada
Attorney, Agent, or Firm—Cushman Darby & Cushman

[57] ABSTRACT

In a reciprocating cutter type trimmer in which blades (14, 15) are reciprocative, the blades (14, 15) are each constructed of a power transmission member (19,18) and an edge member (17, 16) and constitute a separation type blade in which the blades are individually removable, upper and lower blade guide plates (20, 21) are provided for supporting the blades (14, 15) from above and below, and at least one of the upper and lower blade guide plates (20, 21) is rotatably pivoted on the case (4). Exchange of the blade can be carried out easily and rapidly, loss of parts during blade exchanging work can be prevented and the construction can be simplified.

2 Claims, 4 Drawing Sheets

RECIPROCATING CUTTER TYPE TRIMMER

BACKGROUND OF THE INVENTION

1. Field of the Invention

The present invention relates to reciprocating cutter type trimmers and more particularly to a reciprocating cutter type trimmer in which a pair of upper and lower blades are subjected to reciprocation by way of power transmission means such as eccentric cams.

2. Description of the Prior Art

In a reciprocating cutter type trimmer used for trimming bushes and grass, such as clipping weeds at ridges and service waterways, mowing lawns and trimming hedges, the output of a power source such as an internal combustion engine arranged at one end of an operation rod is typically transmitted to a blade unit through a power transmission unit to mutually relatively reciprocate a pair of upper and lower elongated blades in the longitudinal direction to cut bushes and grass.

This type of trimmer having two reciprocating cutters to be reciprocated has hitherto been well known as shown in, for example, FIG. 4. FIG. 4 is a side sectional view of the trimmer according to a conventional example. Upper and lower blades 61 and 62 which are each formed of a generally elongated plate protrude from one side of a case 63 outwardly (frontally) thereof, and they are supported on upper and lower blade guide plates 64 and 65 by means of a plurality of fixing members B so as to be mutually slidable. The output of a power source is transmitted to the blades 61 and 62 through power transmission means so that the blades may be reciprocated to and fro in opposite phases to each other.

In the aforementioned conventional reciprocating cutter type trimmer, when the blades are worn out or broken and exchange or grinding thereof is needed, exchanging of the blades must be done, in the case of a separation type blade, by releasing the plurality of fixing members and then removing the upper and lower blade guide plates. In the case where the blade is not of the separation type (an integral type blade), the case even has to be disassembled and the power transmission member even has to be removed in order to perform exchanging of the blade. Disadvantageously, in any case, exchanging of the blade is very troublesome work and, besides, loss of parts is liable to happen during disassembling, exchanging and assembling work. The present invention has been achieved to solve the above problems of the conventional trimmer and it is an object of the present invention to provide a reciprocating cutter type trimmer which can facilitate exchanging of blades, prevent loss of parts during blade exchanging work and which is simplified in construction.

According to the present invention, to accomplish the above object, in a reciprocating cutter type trimmer comprising a power transmission unit for conversion of rotary motion into linear reciprocation, the present invention provides a case accommodating the power transmission unit, blades protruding from the case frontally thereof and being reciprocative to and fro under the application of power transmitted from the power transmission unit, and upper and lower blade guide plates protruding from the case frontally thereof and being operative to support the blades from above and below, the blades being each divided into a power transmission member coupled to the power transmission unit and an edge member and constituting a separation type blade in which the blades are individually removable, at least one of the upper and lower blade guide plates is rotatably pivoted on the case, and a connecting part of the separation type blade is disposed frontally of a pivotal portion formed at the inner end of the rotatable blade guide plate. As a specified example, the pivotal portion includes a pivotal shaft mounted to the case, and a curved portion formed by winding the inner end of the rotatable blade guide plate about the pivotal shaft.

In the reciprocating cutter type trimmer according to the present invention constructed as above, when the edge member of the blade is to be exchanged, the blade and the part connectable to the power transmission member (i.e., the whole edge member) can be exposed by turning the pivoted one blade guide plate outwards and only the edge member can be removed and exchanged easily.

DESCRIPTION OF THE PREFERRED EMBODIMENT

Figure 1:
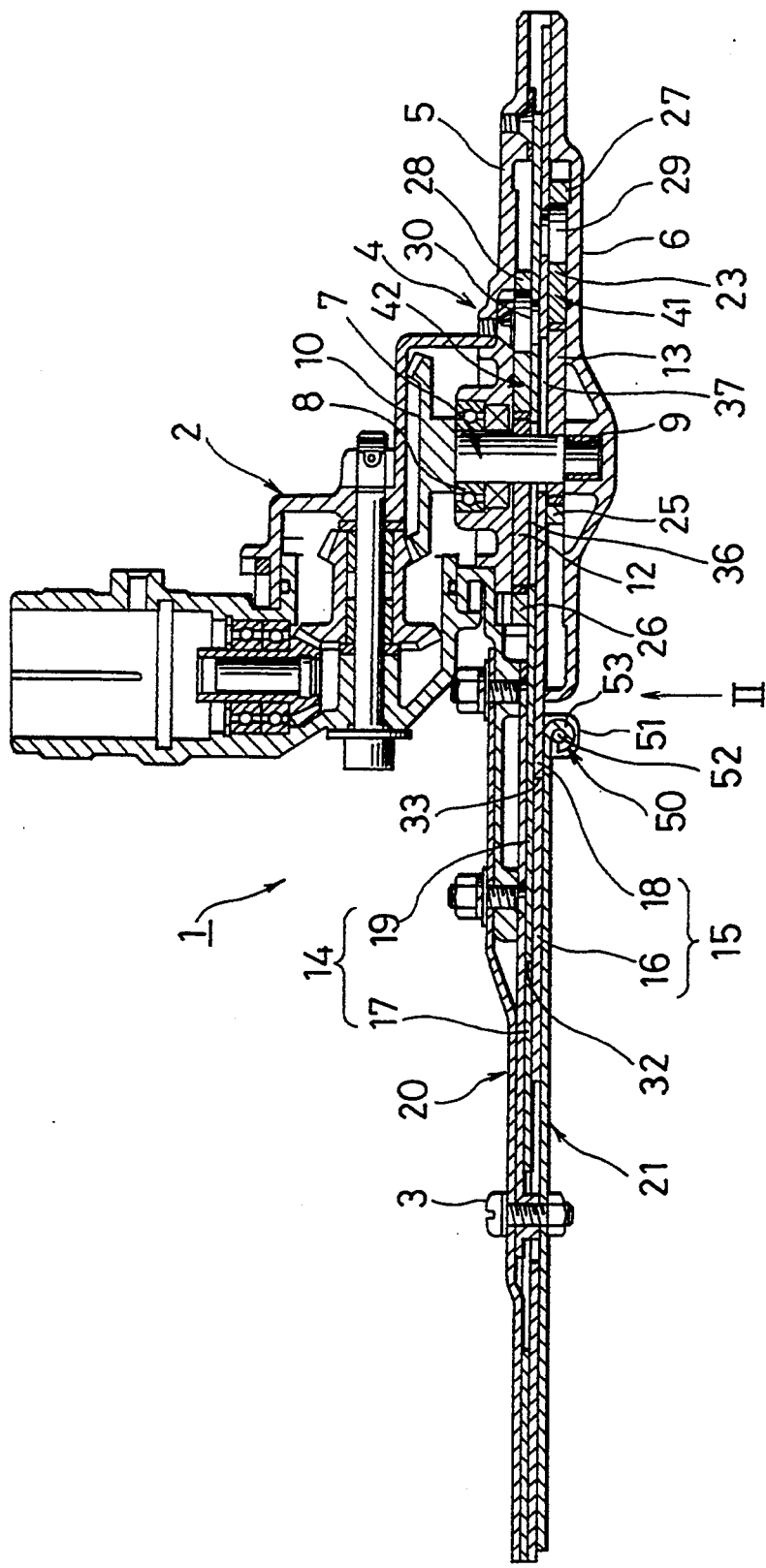
FIG. 1 is a longitudinal sectional view of a reciprocating cutter type trimmer according to the preferred embodiment of the present invention.

An embodiment of the present invention will be described hereunder with reference to the accompanying drawings.

A reciprocating cutter type trimmer 1 has a case 4 attached, at a variable angle, to the tip of a gear reduction unit 2 coupled to the tip of an operation rod (not shown) of the trimmer. The case 4 consists of upper and lower halves 5 and 6 which are put together by means of a plurality of bolts (not shown). A main shaft 7 driven by a power transmission shaft (not shown) in the operation rod is supported rotatably and vertically by the case 4 through bearings 8 and 9, and the main shaft 7 is integrally connected to an output gear 10 of the gear reduction unit 2. Provided on the main shaft 7 are a pair of circular eccentric cams 12 and 13 which are spaced apart from each other vertically in the axial direction of the main shaft 7, these eccentric cams 12 and 13 being oriented so as to have a phase difference from each other through an angle of 180°. Further, a pair of separation type, elongated plate-like upper and lower blades 14 and 15 are arranged so as to protrude frontally and exteriorly of the case 4. The upper blade 14 has an edge member 17 frontally extending from the case 4 and a power transmission member 19 accommodated in the case 4, the two members 17 and 19 being supported by an upper edge guide plate 20. Similarly, the lower blade 15 has an edge member 16 frontally extending from the case 4 and a power transmission member 18 accommodated in the case 4, the two members 16 and 18 being supported by a lower blade guide plate 21. The inner end of the lower blade guide plate 21 is formed with a pivotal portion 50 supported by bearing portions 51 provided at the front end of the case 4. The pivotal portion 50 includes a pivotal shaft 52 and a curved portion 53 formed by winding the inner end of the lower blade guide plate 21 about the pivotal shaft 52.

The lower blade guide plate 21 thus constructed and the upper blade guide plate 20 are clamped together by a bolt 3 with the blades 14 and 15 sandwiched between the upper and lower blade guide plates 20 and 21.

The power transmission members 18 and 19 of the upper and lower blades 14 and 15 have their outer end portions which are removably engageable with T-shaped fit-in type connecting lugs 33 and 32, respectively. Under the engaged state, the power transmission members 18 and 19 and the edge members 16 and 17 are put together to form a separation type blade in which the blades are slidable oppositely in the forward and backward directions.

Figure 2:
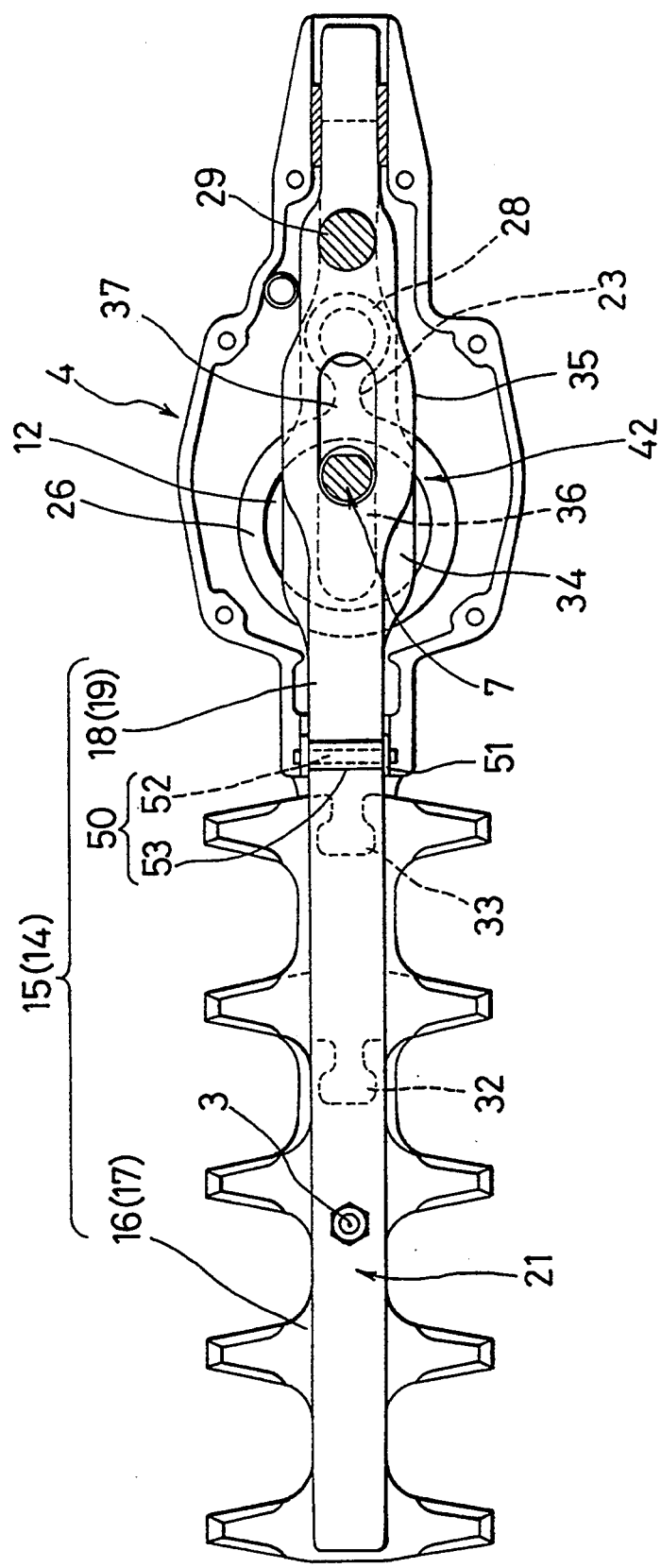
FIG. 2 is a bottom view, partly exploded, as viewed from arrow II in FIG. 1.

As shown in FIG. 2, the lower power transmission member 18 has an intermediate portion within the case 4, which is swelled sidewards to form a laterally curved part 35, and an elongated hole 37 is formed in a longitudinally central part of the laterally curved part 35. Likewise, an intermediate portion within the case 4 of the upper power transmission member 19 is swelled sidewards to form a laterally curved part 34 and an elongated hole 36 is formed in a longitudinally central part of the laterally curved part 34. The elongated holes 36 and 37 overlap each other, and the upper and lower two eccentric cams 12 and 13 are arranged to lie on the top and bottom planes, respectively, of the overlapping elongated holes 36 and 37. The main shaft 7 vertically passes through the eccentric cams 12 and 13 and it is made to be integral with them in such a manner that the upper and lower eccentric cams 12 and 13 are oriented to have a phase difference from each other through an angle of 180°.

The upper and lower power transmission members 19 and 18 for the blades overlap each other, and follower members 42 and 41 which follow the cam motion are provided in the direction of forward and backward motion (in the longitudinal direction) of the blades to contact the upper and lower surfaces of the respective overlapping power transmission members 19 and 18 and to be flush with the respective eccentric cams 12 and 13. The lower follower member 41 is a plate-like member consisting of a connecting rod 23 and large and small circular rings 25 and 27 contiguous to opposite ends of the connecting rod 23. The upper follower member 42 has the same shape as above, having a connecting rod 23 and large and small circular rings 26 and 28. The eccentric cams 12 and 13 are pivotally received in the large end rings 25 and 26 of the follower members 41 and 42, respectively. The small endrings 27 and 28 of the follower members 41 and 42 are pivotally mounted on pins 29 and 30, respectively, connected to the blades 15 and 14.

The operation of the thus constructed reciprocating cutter type trimmer 1 according to the preferred embodiment of the present invention will now be described.

When the main shaft 7 is driven to rotate at a reduced speed by the gear reduction unit 2, the eccentric cams 12 and 13 also are rotated. Through this, the upper and lower follower members 42 and 41 are reciprocated to and fro in opposite phases to each other and additionally, in synchronism therewith, the power transmission members 19 and 18 of the blades as well as the edge members 17 and 16 engaged therewith are also reciprocated to and fro to thereby cut bushes and grass.

Figure 3:
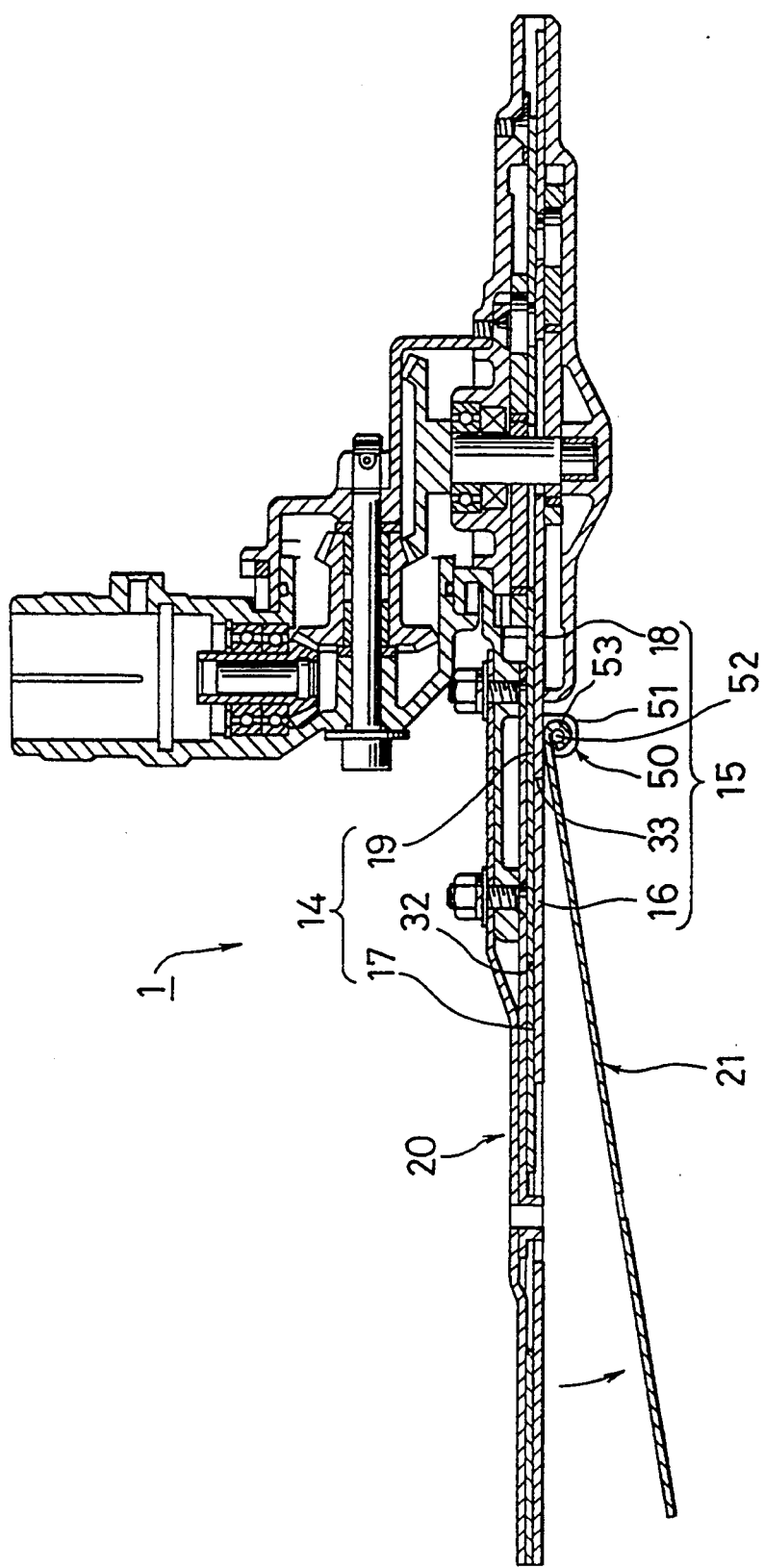
FIG. 3 is a sectional view showing a state in which one blade guide plate is turned.
Figure 4:
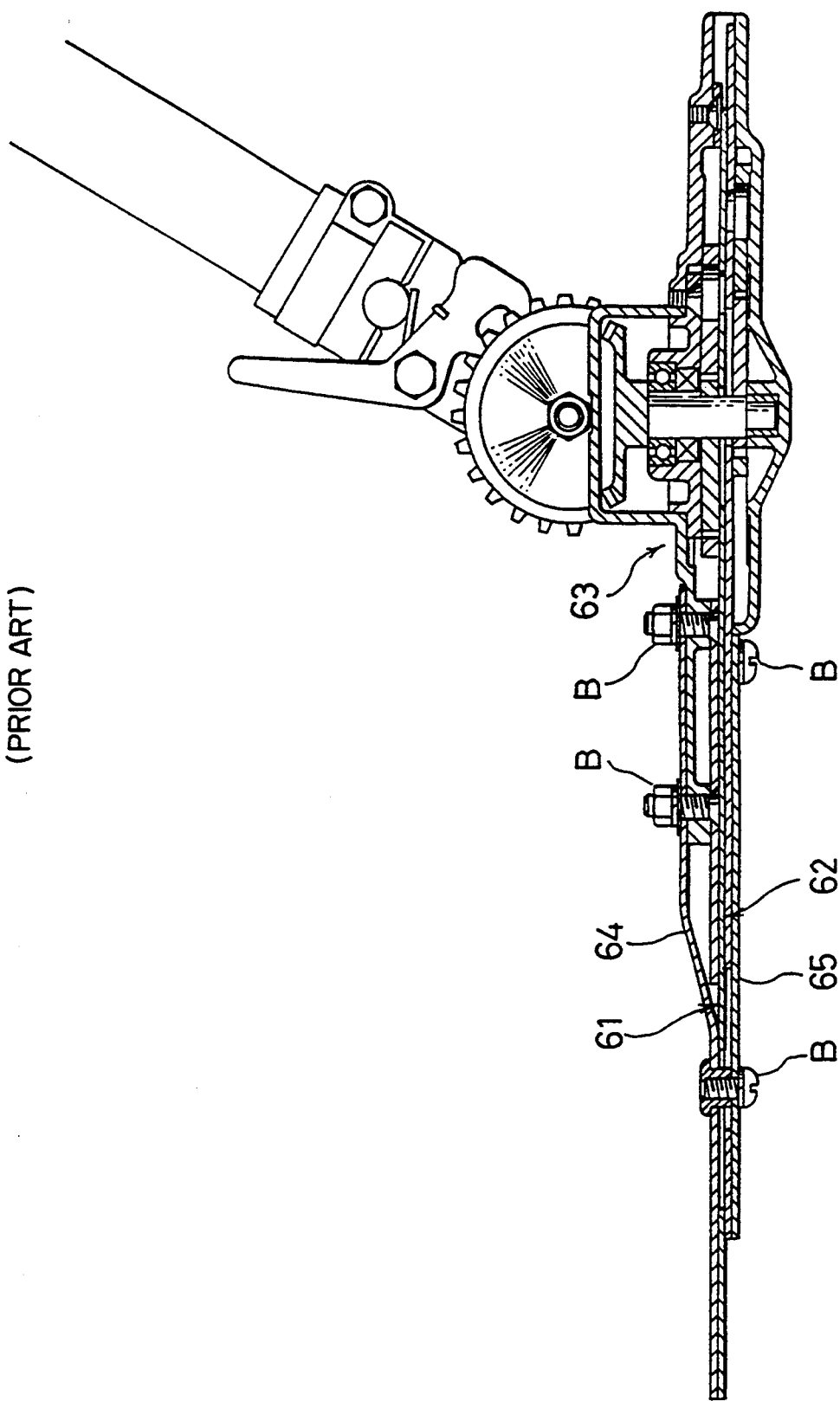
FIG. 4 is a longitudinal sectional view of an example of a conventional trimmer.

When exchange of the edge members 16 and 17 of the blades is to be effected, the bolt 3 is removed and then the lower blade guide plate 21 is opened downwards (see FIG. 3). The fit-in connection 33 forming a connecting part between the edge member 16 and the power transmission member 18 of the lower blade 15 is now exposed frontally outwardly of the pivotal portion 50 even when the power transmission member 18 is drawn in up to the innermost position with respect to the case 4. Accordingly, the edge number 16 alone can be removed downwards easily without removing any other fixing parts and components. Thereafter, only the edge member 17 of the upper blade 14 can be removed in a similar way. After the edge members 16 and 17 are subsequently exchanged with new or ground edge members, the lower blade guide plate 21 is closed and fixed by means of the bolt 3.

The present invention has been described in detail by way of example but it is in no way limited to the embodiment described previously and design modification can be effected in various ways within the scope of the present invention without departing from the appended claims.

For example, in the illustrated example, only the lower blade guide plate is made to be rotatable, but the upper blade guide plate or both of the upper and lower blade guide plates may be made to be rotatable. Obviously, the present invention may be applied to a trimmer in which only one of the blades is reciprocative. As will be seen from the foregoing description, according to the present invention, exchanging of the blade can be carried out easily and rapidly, loss of parts during the blade exchanging work can be prevented, and the construction can be simplified.

What is claimed is:

1. A reciprocating cutter type trimmer comprising a power transmission unit for conversion of rotary motion into linear reciprocation, a case accommodating said power transmission unit, blades protruding from said case frontally thereof and being reciprocative to and fro under the application of power transmitted from said power transmission unit, and upper and lower blade guide plates protruding from said case frontally thereof and being operative to support said blades from above and below, each of said blades being each divided into a power transmission member coupled to said power transmission unit and an edge member individually removable with respect to each other, wherein said lower blade guide plate has an inner end pivotably connected to said case, and a connecting part of said blades is disposed frontally of a pivotal portion formed at said inner end of said lower blade guide.

2. A reciprocating cutter type trimmer according to claim 1 wherein said pivotal portion includes a pivotal shaft mounted on said case, and a curved portion formed by winding said inner end of said lower blade guide plate about said pivotal shaft.

* * * * *